United States Patent
Sawada et al.

(10) Patent No.: US 6,701,331 B1
(45) Date of Patent: Mar. 2, 2004

(54) DATA PROCESSING DEVICE AND METHOD OF PROCESSING DATA

(75) Inventors: Yuji Sawada, Osaka (JP); Hisashi Saiga, Tenri (JP); Masafumi Yamanoue, Yamatokoriyama (JP); Keisuke Iwasaki, Ikoma-gun (JP); Yoshihiro Kitamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/674,197

(22) PCT Filed: Apr. 21, 1999

(86) PCT No.: PCT/JP99/02109

§ 371 (c)(1),
(2), (4) Date: Oct. 27, 2000

(87) PCT Pub. No.: WO99/56204

PCT Pub. Date: Nov. 4, 1999

(30) Foreign Application Priority Data

Apr. 28, 1998 (JP) .............................. 10-117956

(51) Int. Cl.[7] .................. G06F 12/00; G06F 15/00
(52) U.S. Cl. ........................ 707/203; 715/511
(58) Field of Search .......................... 707/7, 100, 203, 707/103 R–103 Z, 500, 511, 516; 709/200–202, 315–316; 715/500.1, 511, 516

(56) References Cited

U.S. PATENT DOCUMENTS 6,275,852 B1 * 8/2001 Filepp et al. ............... 709/220

FOREIGN PATENT DOCUMENTS

| JP | 4-278262 | 10/1992 |
|---|---|---|
| JP | 8-036519 | 2/1996 |
| JP | 9-089581 | 4/1997 |
| JP | 10-27106 | 1/1998 |
| JP | 10-91427 | 4/1998 |

OTHER PUBLICATIONS

Oh!PCT, Softbank Publishing Inc., 16(20):178–187 (Apr. 1, 1998) (partial English language translation).

* cited by examiner

*Primary Examiner*—Alford Kindred
(74) *Attorney, Agent, or Firm*—Edwards & Angell, LLP; John J. Penny, Jr.; David G. Conlin

(57) ABSTRACT

A data processing device enabling stable data processing reads digital data including object data, an identifier indicating a type of the object data, and an attached program associated with at least one identifier for performing a predetermined process for object data associated with the identifier, to process the object data. The data processing device includes a program storing unit for recording an internal program including a processing module associated with the at least one identifier, an input unit for reading the digital data, and an external program executing unit for processing the object data by one of the attached program and the processing module when the attached program associated with the identifier of the read object data is present in the digital data.

11 Claims, 9 Drawing Sheets

FIG. 7

| A | TEXT DATA IDENTIFIER | 2 |
|---|---|---|
| | DATA SIZE | 4 |
| B | TEXT AREA START POINT X COORDINATE | 2 |
| | TEXT AREA START POINT Y COORDINATE | 2 |
| | TEXT AREA END POINT X COORDINATE | 2 |
| | TEXT AREA END POINT Y COORDINATE | 2 |
| | CHARACTER SPACING | 2 |
| | LINE SPACING | 2 |
| | FONT TYPE | 2 |
| | FONT SIZE | 1 |
| | FONT COLOR | 3 |
| | BACKGROUND COLOR | 3 |
| | CHARACTER STRING DATA | N |

FIG. 8

| A | IMAGE DATA IDENTIFIER | 2 |
|---|---|---|
| | DATA SIZE | 4 |
| B | IMAGE X SIZE | 2 |
| | IMAGE Y SIZE | 2 |
| | START POINT COORDINATE (X) | 2 |
| | START POINT COORDINATE (Y) | 2 |
| | COLOR TABLE | N |
| | IMAGE DATA | N |

FIG. 9

| A | UNUSED IDENTIFIER | 2 |
|---|---|---|
| | DATA SIZE | 4 |
| B | VIDEO IMAGE AREA START POINT COORDINATE (X) | 4 |
| | VIDEO IMAGE AREA START POINT COORDINATE (Y) | 2 |
| | COMPRESSION METHOD | 1 |
| | VIDEO DATA | N |

FIG. 10

| A1 | ATTACHED PROGRAM AREA IDENTIFIER | 2 |
|---|---|---|
| | DATA SIZE | 4 |
| B1 | NUMBER OF ATTACHED PROGRAMS | 2 |
| | ATTACHED PROGRAM 1 PROGRAM DATA AREA | N |
| | ......... | |
| | ATTACHED PROGRAM N PROGRAM AREA | N |

| A2 | PROGRAM DATA AREA IDENTIFIER | 2 |
|---|---|---|
| | DATA SIZE | 4 |
| B2 | OBJECT TO BE PROCESSED ITEM IDENTIFIER | 2 |
| | SIZE OF AUTHENTICATION INFORMATION | 4 |
| | AUTHENTICATION INFORMATION | N |
| | SIZE OF PROGRAMMER INFORMATION | 4 |
| | PROGRAMMER INFORMATION | N |
| | SIZE OF VERSION INFORMATION | 4 |
| | PROGRAM VERSION INFORMATION | N |
| | PROGRAM | N |

FIG. 11

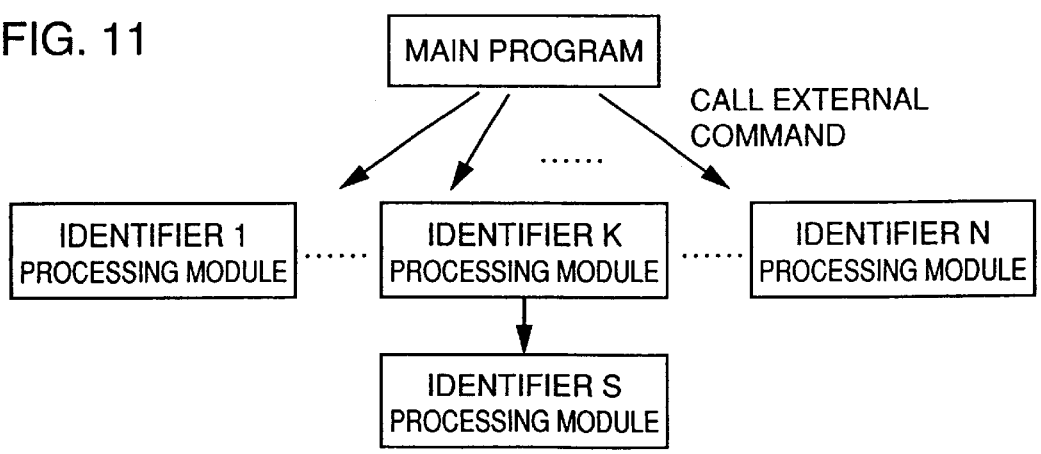

FIG. 12

| IDENTIFIER NUMBER | FILE NAME | PROGRAMMER INFORMATION | VERSION INFORMATION |
|---|---|---|---|
| 1 | PRO1.EXE | PROGRAMMER A | 1.02 |
| 2 | PRO2.EXE | PROGRAMMER B | 1.5 |
| 3 | EMBEDDED | | |
| ⋮ | ⋮ | ⋮ | ⋮ |
| M | PROM.EXE | PROGRAMMER A | 3.1 |

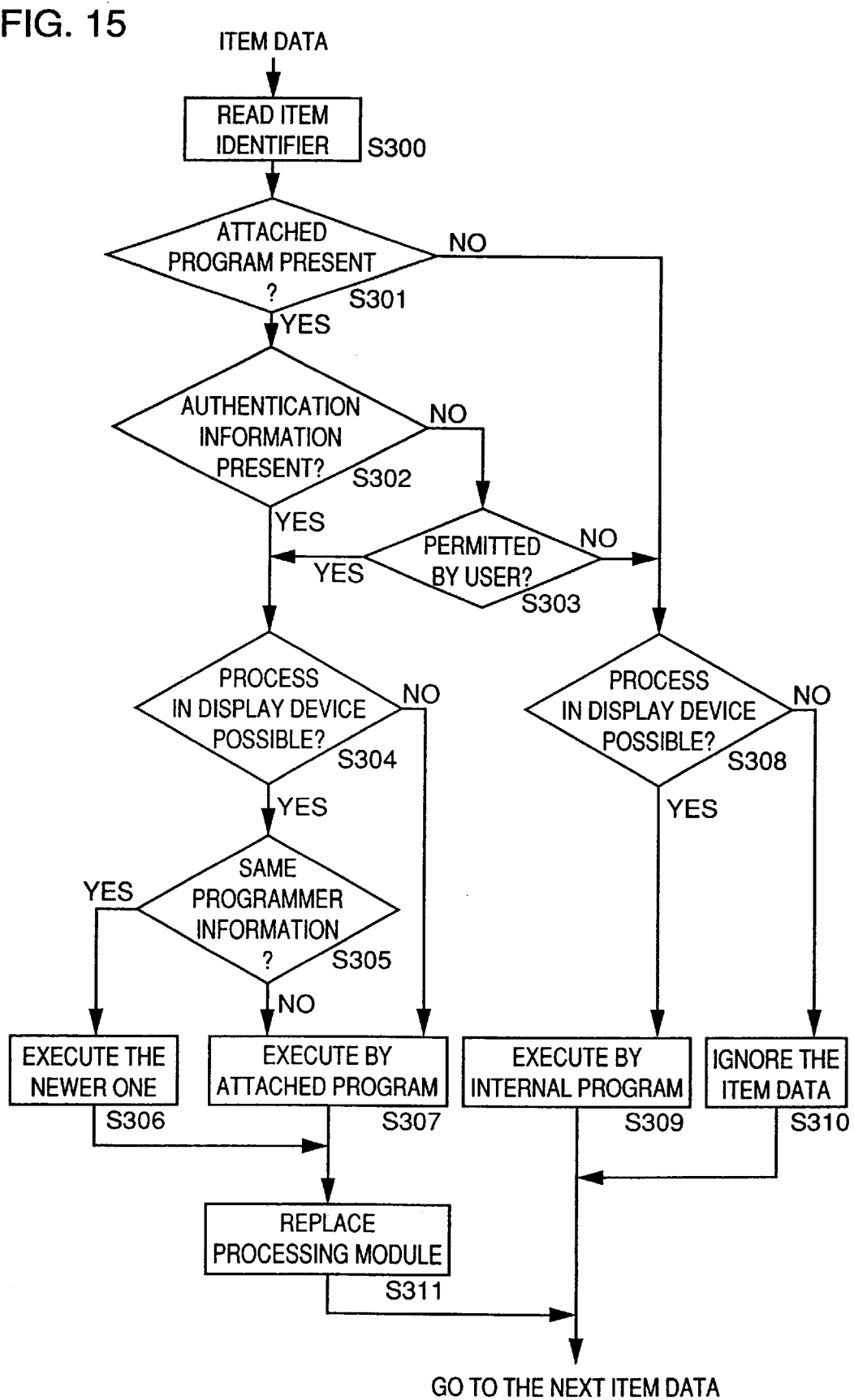

DATA PROCESSING DEVICE AND METHOD OF PROCESSING DATA

TECHNICAL FIELD

The present invention relates to a data processing device and a method of processing data, in particular to a data processing device and a method of processing data enabling extension and modification of a data format and various functions of the data processing device to achieve stable data processing.

BACKGROUND ART

Digital data such as a document file, which can be processed by a computer, is recorded in a recording medium according to some kind of format in order to have compatibility. Generally, any kind of format would be subjected to extension so as to allow an addition of a new function, for example. However, there is a problem in that, in some cases, data cannot be read by a former version of regeneration program and cannot be processed after the format extension, depending on how the extension of a format is performed. Further, data in a format different from the expected format may be read into the regenerating program, possibly causing a crash of the regenerating program.

Japanese Patent Laying-Open No. 4-278262 discloses a digital signal recording/regenerating device, in which an area for storing an identification code is provided in a recording medium storing a digital signal to be regenerated, and the identification code identifies whether the digital signal to be regenerated belongs to a basic function with compatibility or to a dedicated function without compatibility. When the digital signal is regenerated, the digital signal recording/regenerating device first verifies whether or not the digital signal can be regenerated, and then regenerates only signals that can be regenerated. Thus, a manufacturer can freely perform extension of functions while maintaining the compatibility of the digital signal recording/regenerating device.

Data in HTML (Hyper Text Markup Language) format used in the WWW (World Wide Web), an identifier called a tag designates a process and data to be processed. In other words, the data to be processed is designated by interposing object data to be processed between an open tag <abc> ("abc" refers to a name of a tag) and a close tag </abc>. The data interposed between the two tags is subjected to a process assigned to the tag name of "abc." A browser for executing a display process of the HTML data is designed such that extension of functions can be done by adding a new tag.

Further, in the browser, when a tag that cannot be interpreted is encountered, its function can be neglected by skip-reading its open and close tags. Thus, it is possible for the browser to process only the data that can be processed.

Such a browser that interprets data written in HTML format to display the data on a screen has a mechanism of extending a function by adding an external program called plug-in. A plug-in corresponds to each extension such as ".mov," ".avi" or the like attached to the end of a file name to indicate a type of data. If a file of a type that cannot be processed by a browser exists within data in HTML format, the browser examines the extension of the file to start a plug-in corresponding thereto for processing the file.

However, the digital signal recording/regenerating device disclosed in Japanese Patent Laying-Open No. 4-278262 described above has a problem in that a process of an extended function requires a pre-embedded program within the device for executing the process of the extended function, and the execution of the extended function would be impossible if no processing programs exist in the device.

A similar problem lies in a browser interpreting data in HTML format to display the data on a screen.

In a browser using a plug-in, the plug-in is distributed through a route completely different from that of data. Thus, in some cases, a name of an extension of data and a type of the data indicated by the extension do not correspond with each other. If data is regenerated using the plug-in in such cases, data of a type different from that originally expected by the plug-in may be processed. Thus, in the worst possible case, the program of the browser may be crashed.

Further, a plug-in is installed into a browser without consideration of reliability of the plug-in. Therefore, there is a potential risk that a plug-in with low reliability may be embedded, such as a plug-in including a bug, or a plug-in infected with a computer virus.

When a plug-in for data having various functions such as a dynamic image, sound and so forth is taken into consideration, the plug-in must be designed, because of its character as a plug-in, such that it can process any of the functions. This makes a program of the plug-in more complicated compared to a program for processing limited functions only. Thus, there are problems in that a bug tends to get mixed at the time of creation, the creation takes time, verification for operation also takes time, slippage of verification for operation tends to occur and so forth.

DISCLOSURE OF THE INVENTION

An object of the present invention is, therefore, to provide a data processing device, performing extension and modification of a format of an input digital data and various functions of a device body, and selectively installing safe software only as a program within a device, to achieve stable data processing.

Another object of the invention is to provide a method of processing data, performing extension and modification of a format of an input digital data and various functions of a device body, and selectively installing safe software only as a program within a device, to achieve stable data processing.

A data processing device according to one aspect of the invention reads digital data including object data for processing, an identifier indicating a type of the object data, and an attached program associated with the identifier, for performing a predetermined process for the object data to execute a process for the object data. The data processing device includes a program storing unit for storing an internal program including a processing module associated with at least one identifier to perform a predetermined process for the object data; a digital data reading unit for reading digital data; an attached-program's-presence determining unit connected to the digital data reading unit, for determining presence/absence of an attached program associated with the identifier of the read object data in the digital data; a processing-module's-presence determining unit connected to the digital data reading unit and the program storing unit, for determining presence/absence of a processing module corresponding to the identifier of the read object data in the internal program; and a program selecting/executing unit connected to the attached-program's-presence determining unit, the processing-module's-presence determining unit, the digital data reading unit and the program storing unit, for performing a process for the object data using either one of the attached program or the processing module in response to respective outputs of the attached-program's-presence determining unit and the processing-module's-presence determining unit.

Object data and an attached program for processing the object data are distributed together, and the attached program distributed on the same route as that of the object data is used to process the object data. A process by the attached program matched with the object data avoids a problem of crash of the attached program. Further, the attached program have only to process the object data, so that the attached program is simplified, mixing of bugs at the time of creating the attached program is reduced, shorter operation verification time is enabled, and a risk of mis-verification is reduced. Thus, a stable data processing can be achieved.

Preferably, the attached program and the processing module are respectively provided with version information, the data processing device further including a version information comparing unit connected to the digital data reading unit and the program storing unit, for comparing each of the version information of the attached program and the processing module corresponding to each identifier of the object data, and the program selecting/executing unit including a unit connected to the attached-program's-presence determining unit, the processing-module's-presence determining unit, the version information comparing unit, the digital data reading unit and the program storing unit, for processing the object data using either one of the attached program or the processing module in response to respective outputs of the attached-program's-presence determining unit, the processing-module's-presence determining unit and the version information comparing unit.

If, between the attached program and the processing module, the one with a newer version is used to process the object data, a process by a program with fewer bugs can be realized. Thus, a stable data processing can be achieved.

More preferably, the attached program and the processing module are respectively provided with programmer information, the data processing device further including a programmer information comparing unit connected to the digital data reading unit and the program storing unit, for comparing respective programmer information of the attached program and the processing module corresponding to each identifier of the object data, and the program selecting/executing unit including a unit connected to the attached-program's-presence determining unit, the processing-module's-presence determining unit, the programmer information comparing unit, the digital data reading unit and the program storing unit, for processing the object data using either one of the attached program or the processing module in response to respective outputs of the attached-program's-presence determining unit, the processing-module's-presence determining unit and the programmer information comparing unit.

If the programmer information of the attached program and the processing module are displayed on a screen to be executed by a module selected by a user based on the programmer information, a process can be performed by a program considered to have fewer bugs.

More preferably, the attached program and the processing module are respectively provided with version information, the data processing device further including a version information comparing unit connected to the digital data reading unit and the program storing unit, for comparing the version information of the attached program and the processing module each associated with the identifier of the object data with each other, and a processing module replacement unit connected to the version information comparing unit, the digital data reading unit and the program storing unit, for replacing the processing module of an internal program with the attached program in response to an output of the version information comparing unit.

If a newer version selected from the attached program and the processing module is left in the data processing device, a subsequent process can be performed by a program with fewer bugs. Thus, a stable data processing can be performed.

More preferably, if the process by the attached program is to be accepted, the attached program is provided with regeneration acceptance information permitting the process by the attached program, the program selecting/executing unit including a regeneration acceptance information's presence determining unit connected to the digital data reading unit, for determining whether the attached program associated with the identifier of the object data is applied with regeneration acceptance information, and a unit connected to the regeneration acceptance information's presence determining unit, the attached-program's-presence unit, the processing-module's-presence determining unit, the digital data reading unit and the program storing unit, for processing the object data using either one of the attached program and the internal program in response to an output of the regeneration acceptance information's presence determining unit and respective outputs of the attached-program's-presence determining unit and the processing-module's-presence determining unit.

The attached program applied with the regeneration acceptance information is used to process the object data. This enables a process to be performed using safe programs only, eliminating a possibility of a process performed by a program with low reliability, thus ensuring a stable data processing.

A method of processing data according to another aspect of the present invention is used in a data processing device having a processing module associated with at least one identifier for performing a predetermined process for the object data associated with the identifier, and reading digital data including object data, an identifier indicating a type of the object data, an attached program associated with at least one identifier, for performing a predetermined process for the object data associated with the identifier, to process the object data using either one of the processing module or the attached program. The method of processing data includes steps of reading digital data, determining whether the attached program associated with the identifier of the read object data is present in the digital data, processing object data by the attached program when the attached program associated with the identifier of the object data is present, examining whether the processing module associated with the identifier of the object data is present in the internal program when the attached program associated with the identifier of the object data is not present in the digital data, to process the object data by the processing module if the processing module is present.

Object data and an attached program for processing the object data are distributed together, and the attached program distributed via the same path as the object data is used to process the object data. Processing by the attached program matched with the object data avoids a problem of a crash of the attached program. Further, the attached program can be made to process only the object data, so that the attached program itself is simplified, mixing of bugs at the time of creating the attached program is reduced, creation and operation verification time are shortened, and a risk of mis-verification is reduced. Thus, a stable data processing can be achieved.

BRIEF DESCRIPTION OF THE DRAWINGS

FIG. 7 shows an example of a configuration of an object data area in which text data as object data is stored;

FIG. 8 shows an example of a configuration of an object data area in which image data as object data is stored;

FIG. 9 shows an example of a configuration of an object data in which video data not employed in a current format is stored;

FIG. 10 shows an example of a configuration of an attached program area recorded in the book data;

FIG. 11 schematically shows a program storing state in a program storing unit 102;

FIG. 12 shows a program information table having, as elements, meta-information stored in program storing unit 102;

FIG. 15 is a flowchart showing a process procedure for each item data in a second embodiment.

BEST MODES FOR CARRYING OUT THE INVENTION

First Embodiment

An electronic book display device according to the present invention is described below. The electronic book display device reads electronic book data such as a weekly magazine, a novel or a cartoon (hereinafter referred to as "book data"), as digital data, to sequentially regenerate the data for display. It is noted that, though the electronic book display device is described by way of example in the present embodiment, a data processing device in general such as an image filing device regenerating data for display may also be used.

The electronic book display device according to the invention performs extension of functions (including modification thereof), for example, by replacing a program. Thus, if there is element data, which cannot be processed in a conventional electronic book display device before the extension of functions, a program for processing the element data is attached to the element data to perform a process for the element data based on the attached program. This enables the extension of functions of the electronic book display device, and the process for the element data can be executed even if the electronic book display device is unable to execute the process of the extension function. For example, an electronic book display device capable of displaying only static image or text can be made to display a dynamic image such as movie data and animation. Further, in the electronic device according to the invention, only safe programs can selectively be installed. Details are described later.

Figure 1:
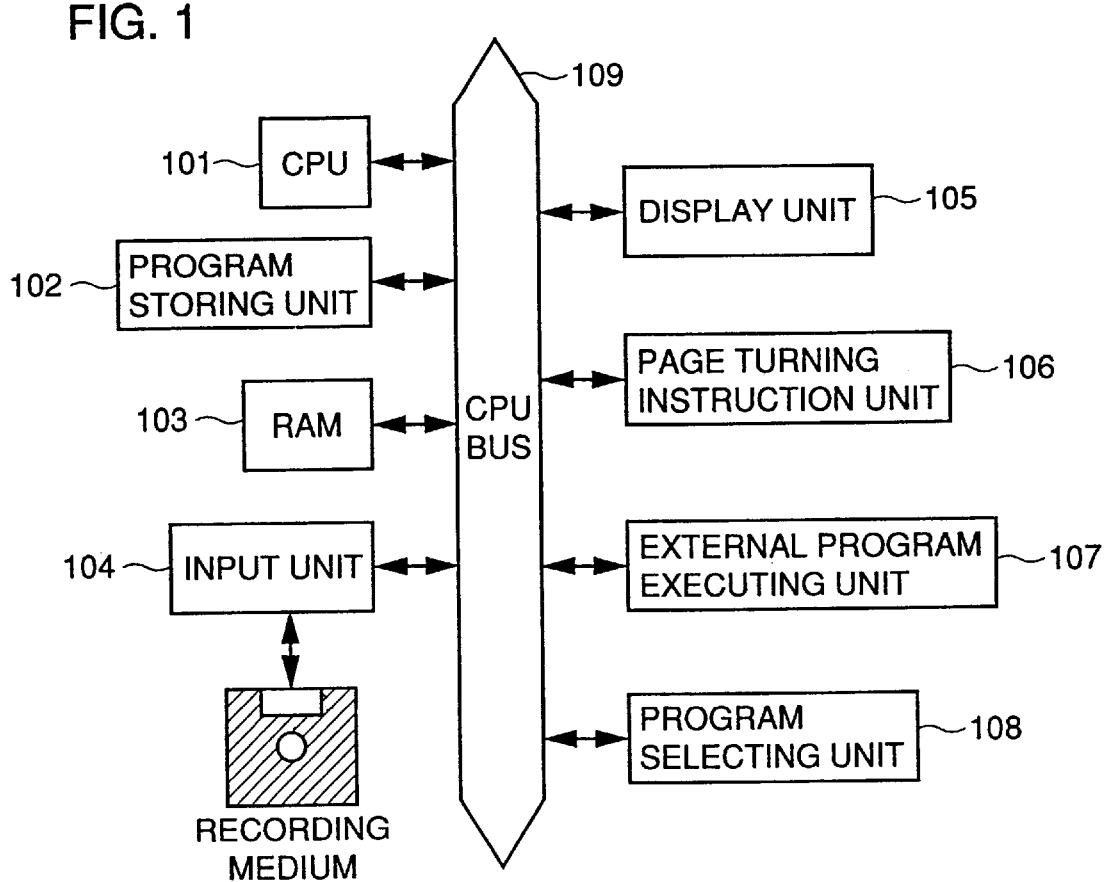
FIG. 1 is a block diagram showing a configuration of an electronic book display device according to an embodiment of the present invention.

Referring to FIG. 1, the electronic book display device according to the embodiment includes a CPU (Central Processing Unit) 101 for controlling the entire device, a program storing unit 102 including a hard disk or the like, for storing a program of the device, a program attached to book data and a meta-information (authentication information, programmer information and version information), a RAM (Random Access Memory) 103 for storing a program to be executed in CPU 101, a working area of the program and book data, an input unit 104 configured from a disk drive reading book data recorded in a recording medium such as an IC (Integrated Circuit) card or a magnetic disk, or a modem receiving book data via a communication line, a display unit 105 for displaying book data, a page-turning instruction unit 106 for instructing turning of a page of book data displayed on display unit 105, an external program executing unit 107 for interpreting and executing the program attached to book data, a program selecting unit 108 for selecting a processing module to be used for a process from a processing module of a program attached to the book data and a processing module of the program stored in program storing unit 102, for instructing CPU101 to replace the processing module stored in program storing unit 102 with the processing module attached to the book data as required, a CPU bus 109 for interconnecting CPU 101, program storing unit 102, RAM 103, input unit 104, display unit 105, page-turning instruction unit 106, external program executing unit 107 and program selecting unit 108. CPU 101 performs various processes according to a program loaded from program storing unit 102 to RAM 103 and in response to an instruction of a user or contents of the book data received via page-turning instruction unit 106.

Figure 2:
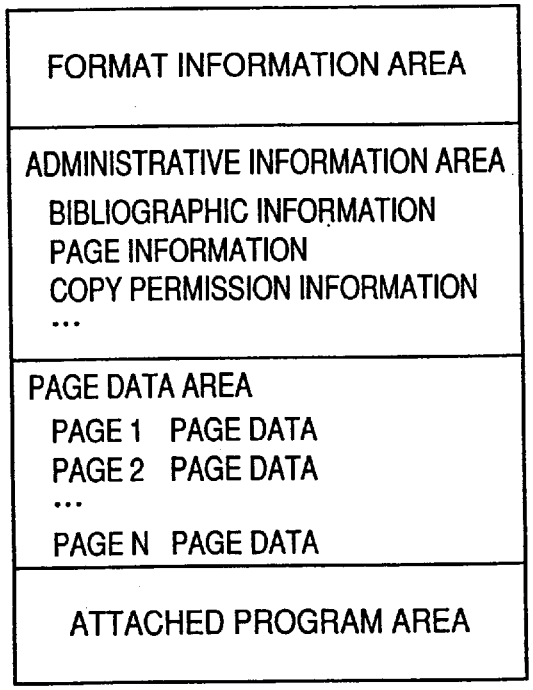
FIG. 2 shows a format of book data regenerated by the electronic book display device according to an embodiment of the present invention.

Referring to FIG. 2, a schematic structure of book data recorded in a recording medium in FIG. 1 is described. As shown in FIG. 2, the book data includes a format information area storing information such as a format name used for recording, an administrative information area including bibliographic information area, page information area, copy permission information area and so forth, a page data area divided into individual pages corresponding to the text of the recorded book data, and an attached program area storing a program for executing a process for at least a part of the data of each area above.

Figures 3, 4:
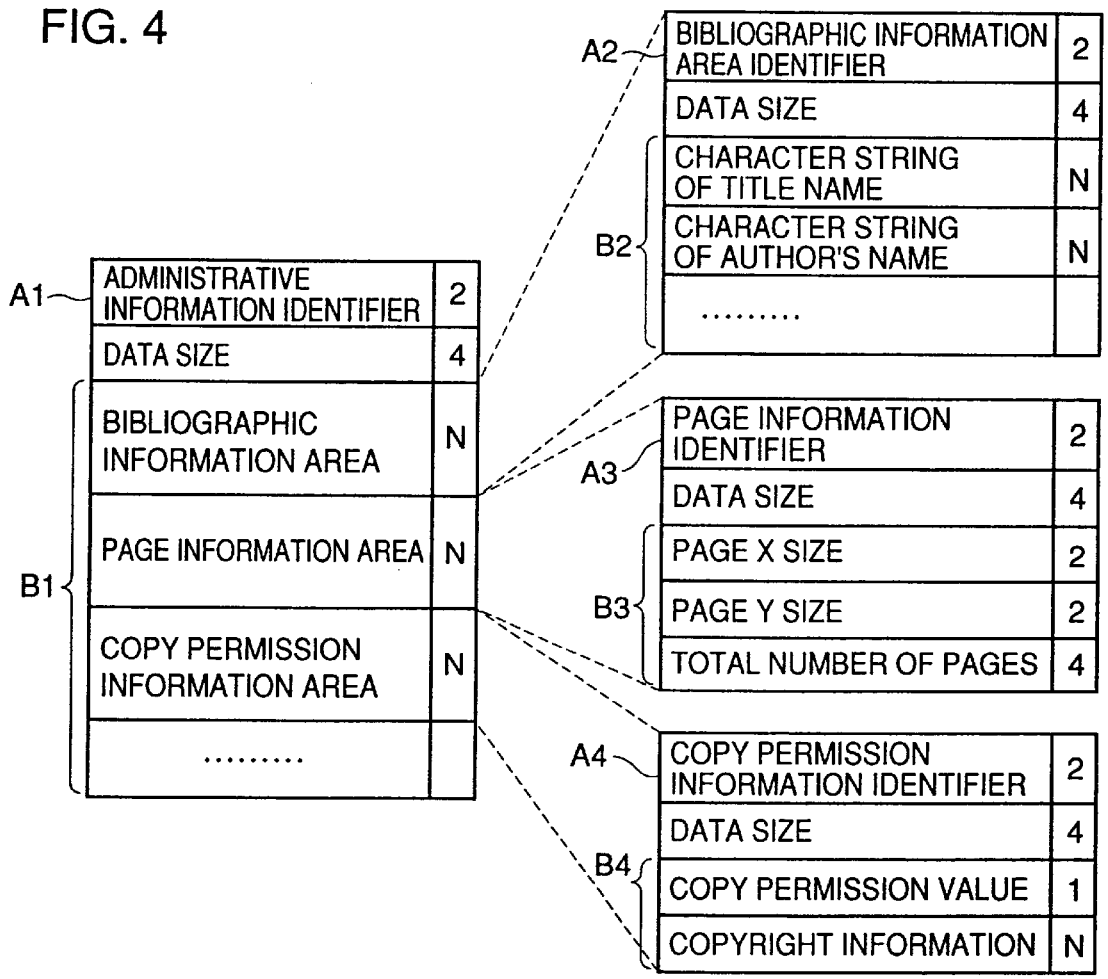
FIG. 3 shows an example of a configuration of a format information area recorded in the book data.
FIG. 4 shows an example of a configuration of an administrative information area recorded in the book data.

Referring to FIG. 3, an example of a configuration of the format information area shown in FIG. 2 will be described. The format information area includes a format information identifier indicating that it is the format information, a data size of areas downward from a subsequently described character string of a format name (area B in the figure), and the character string of the format name. It is noted that a numerical value shown on the right side in FIG. 3 denotes the number of bytes of a data area used for recording each content, and the figure shows that data areas of 2 bytes for the format information identifier and 4 bytes for the data size are respectively used. It can also be seen that a data area of N bytes (N denotes an indeterminate value varying depending on data) is used for the format name character string. It is noted that a numerical value written in the right side of each area will also have similar meaning in subsequent descriptions of FIGS. 4 and 6–10.

As will be described below, book data is stored, divided into a plurality of item data, and every item data is stored to have an item identifier for identifying a type of the item data, a data size of an object data to be processed among the item data, and a format of the object data. For example, in the format information area described above, the format information identifier, the data size and the character string of the format name correspond to the three items above. Some item data may recursively include combinations of these three therein.

A type of item data herein includes not only a type of data such as an image, sound and a character, but also a type of a storage mode of the item data, and item data having different storage modes are determined to be item data of different kinds even though the data type thereof is the same. For example, when format information is stored in such a manner in that the character string of the format name is distracted from the manner of storing the format information area in FIG. 3, the format information is determined to be different, in the type of the item data, from the format information of the mode in FIG. 3. Thus, the format information identifier of this format information is attached with a different item identifier.

The areas of the item identifier and the data size of the item data always have 2 bytes and 4 bytes respectively, independent of the item data. Thus, even if item data that cannot be processed by the electronic book display device exists in the book data, the data size of the object data to be processed among the item data can be accurately read. Therefore, even if the electronic book display device has no knowledge of the storage mode of the item data, it can easily move on to a process of the subsequent item data by skip-reading this item data. It is noted that the number of bytes used for recording both of the above could have other numbers of bytes rather than 2 or 4 bytes, as long as all the item identifier and the data size of the item data are recorded in predetermined sizes. Further, though an end of the item data can be identified by the data size of the object data in the present embodiment, the beginning and the end of the item data may also be identified by a tag as used in an HTML document.

Referring to FIG. 4, an example of a configuration of the administrative information area shown in FIG. 2 is described. The administrative information area includes an administrative information identifier indicating that it is the administrative information area, a data size of data area downward from the subsequently described bibliographic information area (area B1), the bibliographic information area recording a title of a book, a name of an author and so forth, a page information area recording a page size, a total number of pages and so forth, and a copy permission information area recording an instruction of copy permission and a copyright.

The bibliographic information area includes a bibliographic information area identifier indicating that it is the bibliographic information area, a data size of an area downward from a subsequently described character string of a title name (area B2), the character string of the title name of a book, a character string of an author's name and so forth.

The page information area includes a page information identifier indicating that it is the page information area, a data size of an area downward form a subsequently described page X size (area B3), sizes in an X direction and a Y direction of each page (a page X size and a page Y size), a total number of pages and so forth.

The copy permission information area includes a copy permission information identifier indicting that it is the copy permission information area, a data size of an area downward from a subsequently described copy permission value (area B4), the copy permission value for instructing whether a copy is permitted, and an information on the right of authorship. The page X size and the page Y size provided in the page information area respectively indicates an X coordinate and a Y coordinate of a vertex at a lower right portion of a page, in a coordinate system which has, as an origin, a vertex at an upper left portion of a page virtually provided in each page.

Figure 5:
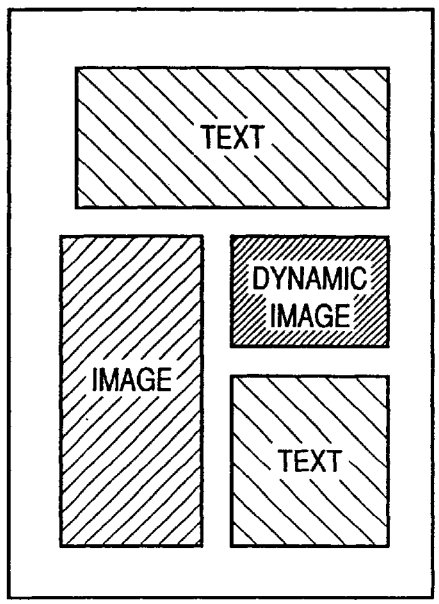
FIG. 5 is a schematic diagram showing an example of a configuration of each page of the book data displayed by the electronic book display device.

As shown in FIG. 5, each page of the book data is configured from element data (hereinafter referred to as "object") such as text data, image data or dynamic image data. Each page is configured by arranging each object on a virtual page space having a page size recorded in the page information area in FIG. 4.

Figure 6:
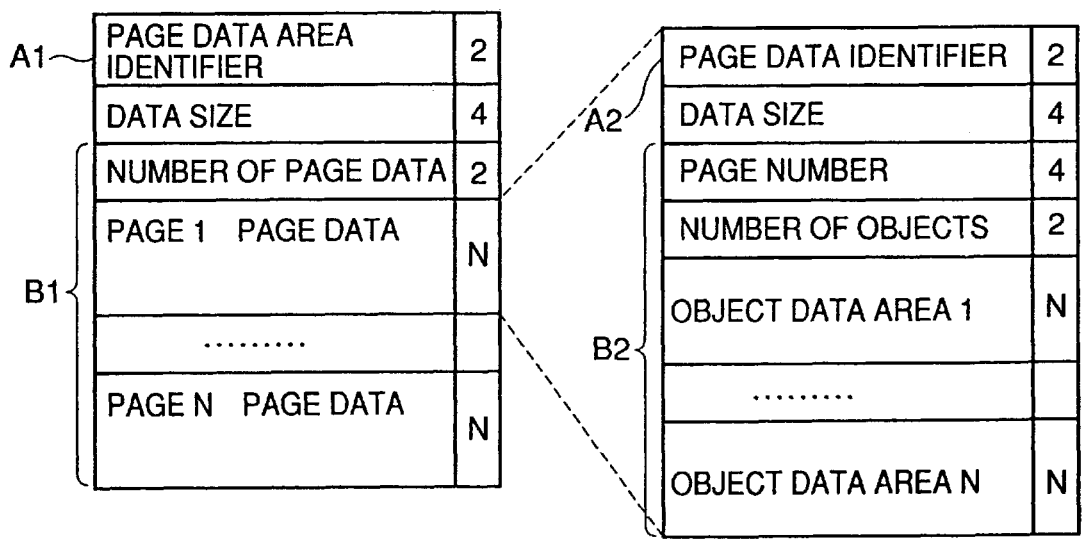
FIG. 6 shows an example of a configuration of a page data area recorded in the book data.

Referring to FIG. 6, an example of a configuration of the page data area shown in FIG. 2 is described. The page data area includes a page data area identifier indicating that it is the page data area, a data size of an area downward from a subsequently described page data number, the page data number indicating a total number of page data, and page data of each page.

The page data of each page includes a page data identifier indicating that it is the page data, a data size of an area downward form a page number (the number of bytes of area B2), the page number of the page data, an object number attached to the page number, and an object data area storing object data of each object.

Object data area stores various types of object data. For example, referring to FIG. 7, the object text data includes a text data identifier indicating that it is the text data, a data size of the object data to be processed described below (data size of area B), coordinates at upper left and lower right of a text area identifying an area indicating the text data (X and Y coordinates of a text area start point, and X and Y coordinates of a text area end point), a character spacing, a line spacing, a font type used for indication of a character string, a font size, a font color designating a color of the character string, a background color and a character string data. Thus, the data size of the object data is known in advance, so that object data can be sequentially read and regenerated in the electronic book display device.

Referring to FIG. 8, the object data of the image data includes an image data identifier indicating that it is the image data, a data size of object data described below (data size of area B), a size in X direction of the image data (image X size), a size in Y direction of the image data (image Y size), start point (X) and start point (Y) coordinates designating a position where the image data is pasted, a color table showing a correspondence between a pixel value used for the image data and an actual pixel density, and the image data.

For each object, object data as shown in FIG. 7 or 8 are prepared, and stored in the object data area in FIG. 6.

It is assumed here that a format administrative organization manages the format of the book data in order to maintain a compatibility of the book data. The format administrative organization manages, for each version of the format, a usable item identifier (a definite value of the item identifier), a type of the item data, a storage mode of the item data, and a regeneration method of the item data. Along therewith, an official version-up of the format is also performed. Any item data not accepted by the format administrative organization corresponds to an extension function.

The item data corresponding to the extension function is embedded into the book data as described below. Assume, for example, that in the version of a current format, video data cannot be utilized as an object in a page data area. Then, in order to extend the current format to be able to handle the video data also as an object, an item identifier unused in the current format is used to describe the object video data. Therefore, referring to FIG. 9, the object video data includes an unused identifier indicating that it is the video data, a data size of object data to be processed described below (data in area B), a position where the video data is pasted (coordinates of video image information start point (X) and video image information end point (Y)), a compression method of the video data, and the video data. Thus, the item data corresponding to an extension function is managed by the currently unused item identifier. The extension function is added not only by the format administrative organization for official version-up of the format, but also by a programmer of the book data.

Even if item data of a new type could be added as described above, a process cannot be performed for the item data unless there is a program for processing the item data. Thus, as shown in FIG. 2, the book data is provided with an attached program area for storing the program for processing the item data.

Referring to FIG. 10, a configuration of an attached program area shown in FIG. 2 is described. The attached program area includes an attached program area identifier indicating that it is the attached program area, a data size indicating a total size of data downward from a subsequently described number of attached programs (size of area B1), the number of programs attached, and a program data area for the number of the programs.

Each program data area includes a program data area identifier for distinguishing a data area of each program, a data size indicting a total size of data downward from a subsequently described item identifier (size of area B2), an item identifier of item data to be processed by the attached program, an authentication information and the size thereof, a programmer information that can identify the programmer of the program and the size thereof, a version information of the program and the size thereof, and a program for processing the item data to be processed. The authentication information, the programmer information and the version information correspond to meta-information of the program. Note that the meta-information may also include other items.

The authentication information is information in the form of a character string, for example, issued when the format administrative organization determines that the program can be officially distributed to users. The authentication information is issued to a highly secured program causing no malfunction even when the program is executed not only for the attached book data, but also for the item data in the other book data. Though a pre-determined authentication character string or the like may be directly written as it is into the authentication information, the character string may also be encrypted in order to prevent distribution of an unauthorized program. For example, a character string different for each book, such as a title of book data, may be a key to encryption and an authentication character string may be encrypted, for making contents stored in the area of the authentication information to be different for each book. A program in which the authentication information is correctly recorded may be stored into the electronic book display device as described later, and may be utilized for the other book data. It is noted that, in the case where a program stored in the program data area is not approved for distribution by the format administrative information organization, i.e., where a programmer of book data personally extends the function, no recording is made in the authentication information area and the size of the authentication information would be 0. In this case, the attached program is limited for use to process the item data attached to the book data. The item data is the one corresponding to an object item identifier in the attached program area.

Further, the object item identifier of a program stored in the attached program area may be an item identifier officially used in a current format. The item data corresponding to the object item identifier in this case is processed basically by a program in the device. However, when a process different from that of an internal program or a process by a program having a performance better than the internal program is desired, the processing program is attached to the attached program area, to perform a process for the item data by the attached processing program. Thus, a program attached to the book data is basically given a priority for execution. Though a form of a program attached to the attached program area is not specified, a program for which any CPU can perform the process is preferred, since any type of CPU could be mounted on the electronic book display device for regenerating the book data for display. For example, a program written in a script language or a program written in JAVA language developed by Sun Microsystems, Inc., U.S.A. may be recorded in this area. Then, at the side of the electronic book display device, means for interpreting and executing the program written in the script language would be necessary, and external program executing unit 107 is provided as the means.

Referring to FIG. 11, a program operating in the electronic book display device is described. The program includes a processing module executing a predetermined process for each item identifier, and a main program controlling a call execution or the like of each processing module. Each processing module is stored in program storing unit 102 as a file different from a main program. As previously described, in some item data, a hierarchical relationship may exist such that a different item data further exists in the item data. Thus, as shown in a processing module of an identifier K in FIG. 11, each processing module may further call a different processing module (a processing module of an identifier S). It is noted that the program of the present embodiment is not to be limited to this form, and as long as each processing module is separable for each item identifier, each processing module and a main program can be integrated into one file.

It is noted that some item identifiers may not extract a process as one processing module, i.e., some item identifiers would not respectively correspond one-to-one with processing modules. This is due to the fact that transfer of an optional argument or a process result to unknown processing module is not possible. For example, in the case of a module processing a page information area in FIG. 4, an analyzed page size and the total number of pages are used in the main program or in other modules. When this process result cannot be transferred to the main program, the main program or the other module cannot be processed. Thus, a module processing the page information area cannot be divided into individual modules. On the other hand, a processing module processing the image data in FIG. 8 interprets and displays the contents written in FIG. 8. For the execution of this processing module, no other information is required except for the contents shown in FIG. 8, and the processing result would not be utilized in the other processing module. In such a closed processing, the module can be divided into individual modules. It is also possible to store only such a dividable module, divided as shown in FIG. 11, into an external file within program storing unit 102, the other modules that cannot be divided being embedded in the main program. However, where the argument or the process result can be transferred between modules, it is more preferable to divide all into processing modules for each item identifier, as shown in FIG. 11.

Referring to FIG. 12, meta-information concerning a processing module of each item identifier is stored in a program information table. The program information table is recorded in program storing unit 102. In the program information table, a file name of the processing module, programmer information concerning a programmer and version information on the processing module are recorded for the processing module of each item identifier. In this table, meta-information on processing modules corresponding to all identifiers that can be processed by the electronic book display device are recorded, while meta-information concerning the processing modules corresponding to identifiers that cannot be processed are not recorded. Further, for a processing module embedded within the main program and not separated, a character string "embedded" is written in a column for a file name of the processing module, so as to be found that it is embedded in the main program.

A method of processing regeneration/display of the electronic book display device is simply described. First, the power of the electronic book display device is turned on, contents of a format information area and an administrative information area of book data are read to launch a process of displaying page data. It is assumed that the display takes place sequentially from the top page, and all the object data pasted on a page to be displayed is read and regenerated one by one in accordance with the type of an object, to perform a display process for the page. Whenever page turning is instructed by instruction unit 106, the page number of the displayed page is updated, and the object data included in the page is read to regenerate each page for display in accordance with a type of the object.

While book data is regenerated and displayed as described above, each information on the book data is recorded as a combination of an item identifier, a data size of the object data and the object data. Thus, any electronic book display device performs a process by the unit of this combination.

Figure 13:
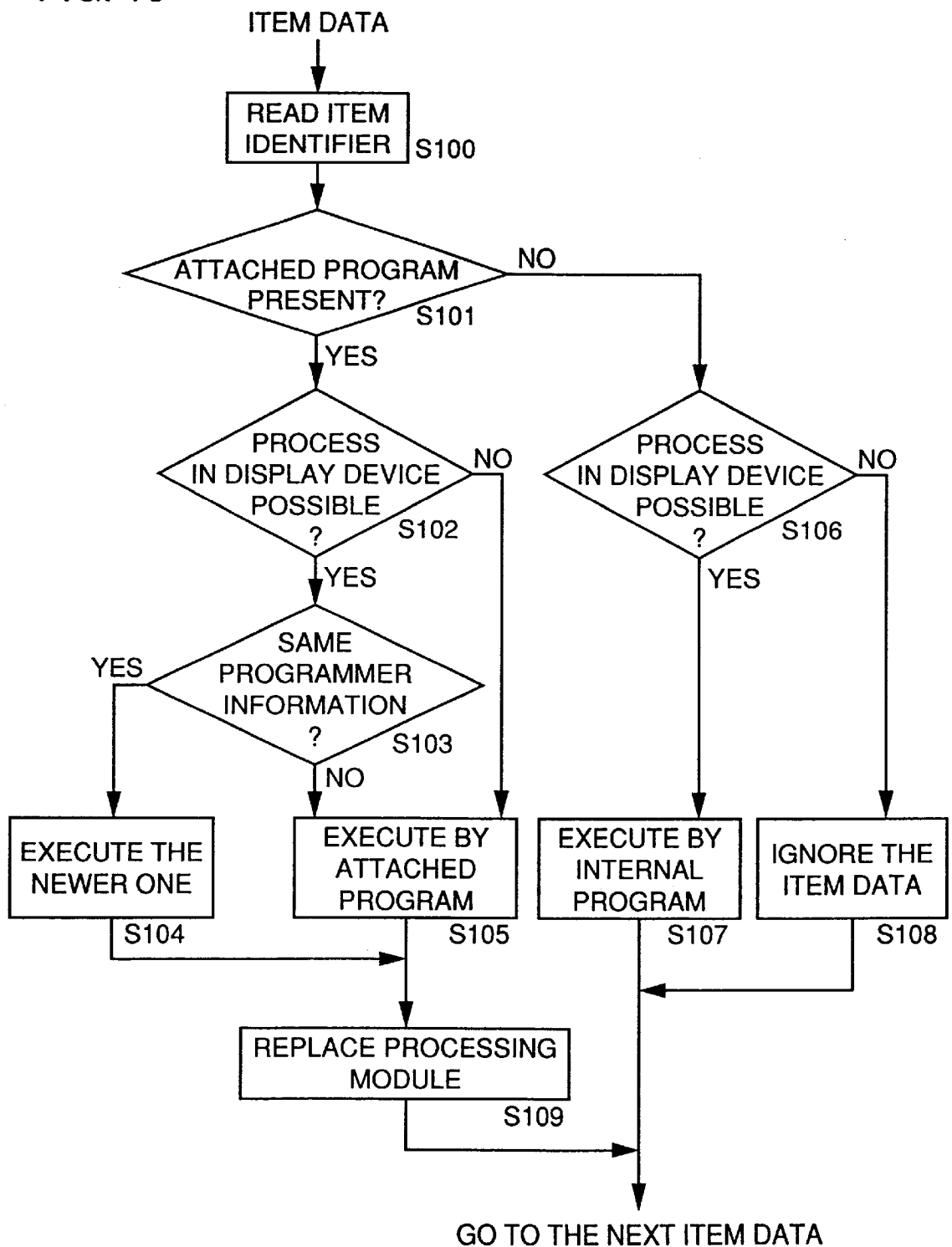
FIG. 13 is a flowchart showing a process procedure for each item data.

An operation of the electronic book display device is described using a flowchart shown in FIG. 13, illustrating a process procedure for each item data. Note that the process as shown in FIG. 13 would not be performed when a processing program of item data cannot be divided into individual processing modules and is merged in the main program, as the process is performed according to the main program rather than the process as shown in FIG. 13. It is noted, in the present embodiment, that a program prepared for each item identifier is formed as a processing module, and the attached program of the book data is also one processing module.

An item identifier is sequentially read (S100). The attached program area of the book data is examined to determine whether there is an attached program of which object of processing is item data associated with the read item identifier (S101). If the attached program for processing is found (YES in S101), a program information table as shown in FIG. 12 stored in program storing unit 102 is examined to see whether meta-information concerning to the processing module of an item identifier currently in process is recorded (S102). If the meta-information is not recorded (NO in S102), it is determined that the process cannot be performed by an internal program of the electronic book display device, and the item data is processed by the program attached to the book data (S105). If the meta-information concerning the processing module of the item identifier is recorded in the program information table (YES in S102), the programmer information of the processing module in the program information table is compared with the programmer information of the attached program stored in the form shown in FIG. 10, to determine whether or not the programmers are the same (S103). If the programmer information match with each other (YES in S103), version information on both programs are compared, and the item data is processed by the newer program thereof On the other hand, if the programmer information are different (NO in S103), the process of the item data is executed by the program attached to the book data (S105). After terminating the processes in S104 or S105, as described later, a part of the processing module of the internal program of the electronic book display device is replaced by the attached program under a certain condition (S109), and the process for the item data is terminated.

If there is no attached program for processing in the book data (NO in S101), it is determined in the internal program of the electronic book display unit, as in the process in S102, whether or not a process for the item data is possible (S106). If it is determined that the process is possible (YES in S106), the item data is processed by the internal program (S107). If it is determined that the process is impossible (NO in S106), no process is performed for the item data, and the item data is skipped reading according to the data size added to the item data (S108).

Figure 14:
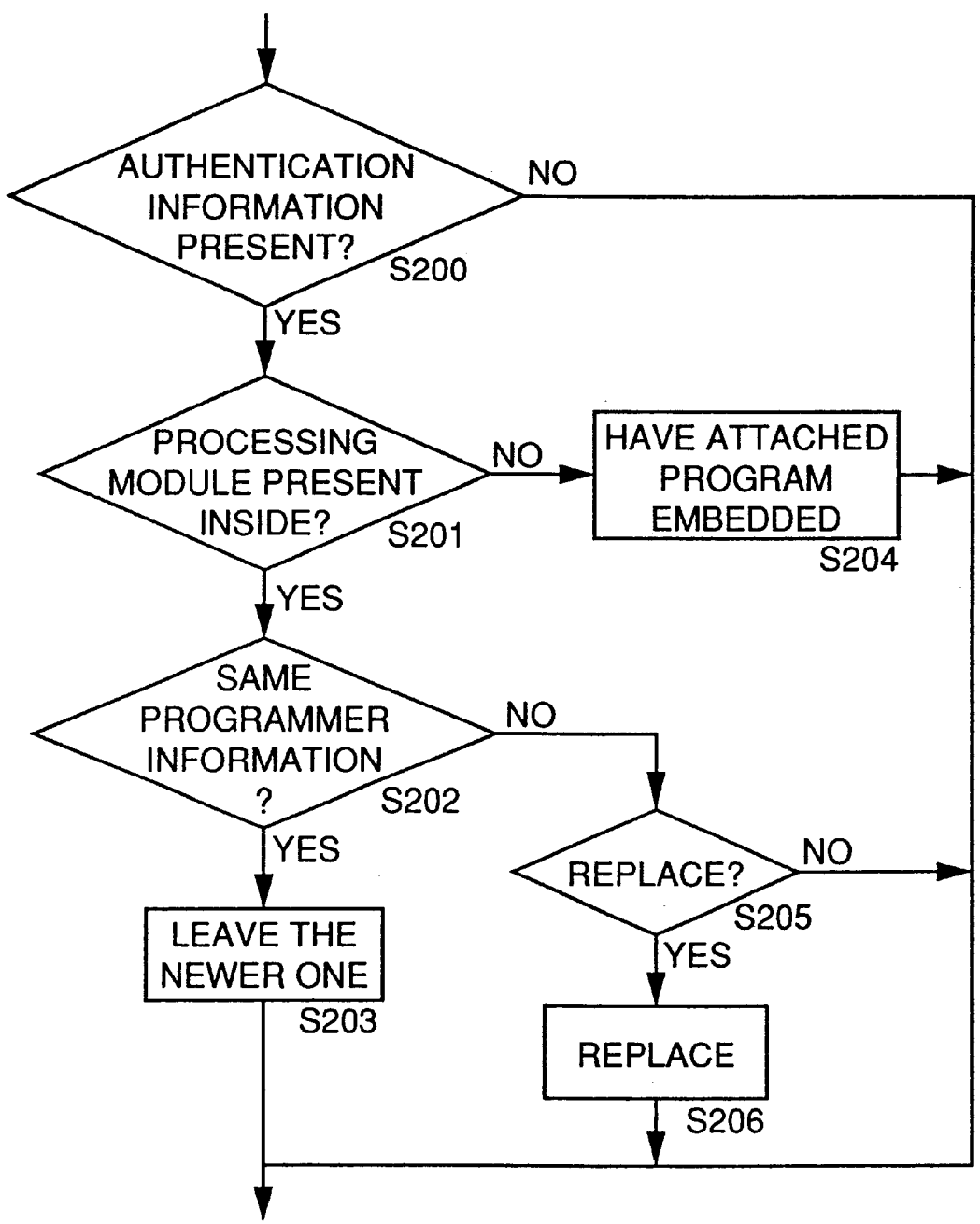
FIG. 14 is a flowchart showing, among process procedures of item data, a process procedure at the time of storing the attached program into the electronic book display device.

Referring to FIG. 14, replacement process of a processing module in S109 shown in FIG. 13 is described. The program attached to the book data is examined as to whether or not the authentication information is recorded therein (S200). If the authentication information is not recorded (NO in S200), the process is terminated without replacing the program recorded in program storing unit 102. If the authentication information is recorded (YES in S200), the program information table is examined as to whether or not the meta-information concerning the processing module of the item identifier to be processed is recorded (S201). If the meta-information is not recorded (NO in S201), it is determined that there is no processing module concerning the identifier within the electronic book display device, and the attached program is stored with a file name in program storing unit 102 in the device while the meta-information added to the attached program is referred, and an identifier to be processed, a file name of the program and programmer information and version information of the program are written in the program information table (S204).

If the meta-information concerning the processing module of the object item identifier to be processed is recorded in the program information table (YES in S201), it is determined that the processing module concerning the identifier is stored within the electronic book display device, and the programmer information of the processing module concerning the item identifier recorded within the program information table is compared with the programmer information added to the program attached to the book data (S202). If the programmer information match with each other, the version information of both programs are compared with each other to leave the newer one in the electronic book display device (S203). Therefore, if the program attached to the book data is newer, the attached program is stored with a file name in program storing unit 102, and the file name and the version information are rewritten by the meta-information of the attached program, among the meta-information concerning the processing module of the identifier in the program information table. When the program information table is rewritten, the processing module originally recorded in program storing unit 102 may or may not be erased.

If the programmer information are different (NO in S202), a user is asked if the processing module should be replaced (S205). When the user instructs to replace the processing module (YES in S202), the attached program is stored with a file name in program storing unit 102, and the meta-information of the corresponding portion in the program information table is rewritten (S206). After rewriting of the processing module in the process of S203, S204 and S206, each item data is processed with reference to the updated program information table. As a result, the corresponding item data is processed by the rewritten attached program.

Second Embodiment

An electronic book display device according to the second embodiment is formed to have a hardware configuration similar to that of the electronic book display device according to the first embodiment. Thus, the description thereof will not be repeated.

In the electronic book display device according to the second embodiment, two types of authentication information is used as authentication information of the attached program. The first one is regeneration acceptance information including a character string and so forth, indicating that execution of the attached program is permitted, and the second one is replacement acceptance information including character string and so forth, indicating that execution of the attached program is permitted together with replacement of the internal program of the display device. The regeneration acceptance information and the replacement acceptance information are both issued by a format administrative organization. The attached program in which the regeneration acceptance information is stored in the authentication information area shown in FIG. 10 is limited for use only in regeneration of the item data within the book data to which the program is attached. The attached program is formed to regenerate only the item data within the book data to which the program is attached, so that there are advantages in that the size of the program is reduced, the development period is shorter, and no bugs tends to get mixed at the time of the development.

On the other hand, the attached program in which the replacement acceptance information is stored in the authentication information area is used not only for generation of the item data within the attached book data, but also for generation of the item data in other book data. Therefore, the process program within the electronic book display device can be updated, and the version-up of the format of the book data can be flexibly addressed. Further, the determination whether or not the program without these authentication information is executed is made by inquiring a user of the electronic book display device.

Formats of the other item data is similar to the one in the first embodiment, and the description thereof will not be repeated.

Referring to FIG. 15, an operation of the electronic book display device is described using a flowchart illustrating a process procedure for each item data.

The processes in S300 to S301 are similar to those in S100 to S101 in FIG. 13, and the description thereof will not be repeated. If a program processing current object item data to be processed is attached to the book data (YES in S301), an authentication information area added to the attached program is examined to determine whether or not regeneration acceptance information or replacement acceptance information is stored (S302). If either authentication information is stored (YES in S302), processes in S304 to S311 are performed as in the processes in S102 to S109 in FIG. 13.

If neither authentication information is stored (NO in S302), meta-information of the attached program is displayed on display unit 105, and a user is inquired whether the object item data may be processed by the attached program (S303). If the user permits the process by the attached program (YES in S303), processes in S304 to S311 are executed.

If the user does not permit the process by the attached program (NO in S303), or if there are no attached programs (NO in S301), processes in S308 to S310 are performed as in the processes in S106 to S108 in FIG. 13. After the processes in S306 and S307, a replacement process in S311 is performed, which is similar to the replacement process of the first embodiment described with reference to FIG. 14. Thus, the description thereof will not be repeated. In this embodiment, different from the first embodiment, the authentication information is checked for the regeneration process. Therefore, the risk experienced at the time of execution of the attached program can be reduced.

According to the present invention, the program attached to data enables the execution of the process for the data that could not be processed conventionally. This facilitates addition of new functions that did not exist before.

Further, data and programs are distributed together. Thus, variance between the contents of data to be processed by the attached program and the actual contents of the data can be eliminated, preventing malfunction such as program crash.

Moreover, the attached program is basically used only for processing the attached data. Thus, the program processing the data is simplified, the development period of the program is shortened, and the possible bugs at the time of creating the program can be reduced.

Furthermore, since only a safe program in which authentication information is recorded is stored in the device, the risk of incorporating a program with low reliability is reduced.

Industrial Applicability

As described above, in the electronic book display device according to the present invention, data and a program for processing the data are distributed together. Therefore, problems in processing data, such as program crash, can be prevented, and the device is suitable for comfortable data inspection.

What is claimed is:

1. A data processing device reading digital data including object data, an identifier indicating a type of said object data, and an attached program, for performing a predetermined process for said object data, to perform a process for said object data, said data processing device comprising:
program storing means for storing an internal program including a processing module, for performing a predetermined process for said object data;
digital data reading means for reading said digital data;
attached-program's-presence determining means connected to said digital data reading means, for determining whether said attached program is associated with said identifier of the read said object data;
processing-module's-presence determining means connected to said digital data reading means and said program storing means, for determining whether said processing module present in said internal program corresponds to said identifier of the read said object data; and program selecting/executing means connected to said attached-program's-presence determining means, said processing-module's-presence determining means, said digital data reading means and said program storing means, for performing a process for said object data using one of said attached program and said processing module in response to respective outputs of said attached-program's-presence determining means and said processing-module's-presence determining means, wherein said attached program and said processing module are respectively provided with programmer information;

said data processing device further comprising:

programmer information comparing means connected to said digital data reading means and said program storing means, for comparing respective programmer information of said attached program and said processing module, each corresponding to said identifier of said object data; wherein said program selecting/executing means includes means connected to said attached-program's-presence determining means, said processing-module's-presence determining means, said programmer information comparing means, said digital data reading means and said program storing means, for performing a process for said object data using one of said attached program and said processing module in response to respective outputs of said attached-program's presence determining means, said processing-module's-presence determining means and said programmer information comparing means.

2. A data processing device reading digital data including object data, an identifier indicating a type of said object data, and an attached program, for performing a predetermined process for said object data, to perform a process for said object data, said data processing device comprising:

program storing means for storing an internal program including a processing module, for performing a predetermined process for said object data;

digital data reading means for reading said digital data;

attached-program's-presence determining means connected to said digital data reading means, for determining whether said attached program is associated with said identifier of the read said object data;

processing-module's-presence determining means connected to said digital data reading means and said program storing means, for determining whether said processing module present in said internal program corresponds to said identifier of the read said object data; and program selecting/executing means connected to said attached-program's-presence determining means, said processing-module's-presence determining means, said digital data reading means and said program storing means, for performing a process for said object data using one of said attached program and said processing module in response to respective outputs of said attached-program's-presence determining means and said processing-module's-presence determining means, wherein said attached program and said processing module are further respectively provided with version information;

said data processing device further comprising:

version information comparing means connected to said digital data reading means and said program recording means, for comparing respective version information of said attached program and said processing module, each corresponding to said identifier of said object data; wherein said program selecting/executing means includes means connected to said attached-program's-presence determining means, said processing module's-presence determining means, said programmer information comparing means, said version information comparing means, said digital data reading means and said program storing means, for performing a process for said object data using one of said attached program and said processing module in response to respective outputs of said attached-program's-presence determining means, said processing-module's-presence determining means, said programmer information comparing means and said version information comparing means.

3. A data processing device reading digital data including object data, an identifier indicating a type of said object data, and an attached program, for performing a predetermined process for said object data, to perform a process for said object data, said data processing device comprising:

program storing means for storing an internal program including a processing module, for performing a predetermined process for said object data;

digital data reading means for reading said digital data;

attached-program's-presence determining means connected to said digital data reading means, for determining whether said attached program is associated with said identifier of the read said object data;

processing-module's-presence determining means connected to said digital data reading means and said program storing means, for determining whether said processing module present in said internal program corresponds to said identifier of the read said object data; and program selecting/executing means connected to said attached-program's-presence determining means, said processing-module's-presence determining means, said digital data reading means and said program storing means, for performing a process for said object data using one of said attached program and said processing module in response to respective outputs of said attached-program's-presence determining means and said processing-module's-presence determining means, wherein said attached program and said processing module are respectively provided with programmer information:

said data processing device further comprising:

said programmer information comparing means connected to said digital data reading means and said program storing means, for comparing respective programmer information of said attached program and said processing module, each corresponding to said identifier of said object data, and inquiring a user whether the processing module should be replaced if programmer are different; and processing module replacing means connected to said programmer information comparing means, said digital data reading means and said program storing means, for replacing said processing module of said internal program with said attached program in response to said programmer information comparing means.

4. The data processing device according to claim 1, wherein said attached program and said processing module are further provided with version information;

said data processing device further comprising:

version information comparing means connected to said digital data reading means and said program storing means, for comparing respective version information of said attached program and said processing module, each corresponding to said identifier of said object data; wherein said processing module replacing means includes means connected to said programmer information comparing means, said version information comparing means, said digital data reading means and said program storing means, for replacing said processing module of said internal program in response to respective outputs of said programmer information comparing means and said version information comparing means.

5. The data processing device according to claim 3, wherein said attached program is further provided with replacement authentication information when replacement of said processing module of said internal program with said attached program is accepted; and said programming module replacement means includes replacement-authentication-information's-presence determining means connected to said digital data reading means, for determining whether said replacement authentication information is applied to said attached program corresponding to said identifier of said object data, and means connected to said replacement-authentication-information's-presence determining means, said version information comparing means, said digital data reading means and said program storing means, for replacing said processing module of said internal program with said attached program in response to an output of said replacement-acceptance-information's-presence determining means and an output of said programmer information comparing means.

6. A method of processing data in a data processing device having a processing module associated with at least one identifier, for performing a predetermined process for object data associated with said identifier, reading digital data including object data; an identifier indicating a type of said object data, and an attached program for performing a predetermined process for said object data associated with said identifier, to perform a process for said object data using one of said processing module and said attached program, said method comprising steps of:

data reading for reading said digital data;

attached-program's-presence determining for determining whether said attached program is associated with said identifier of the read said object data;

processing module's-presence determining for examining whether said processing module is associated with said identifier of said object data;

processing program selecting for selecting which one of said attached program and said processing module is used for processing based on a determination result of said steps of attached-program's-presence determining and processing-module's-presence determining; and data processing for processing said object data by a program selected by said step of processing program selecting, wherein each of said attached program and said processing module are provided with programmer information; and said step of processing program selecting further includes steps of programmer information comparing for examining whether said respective programmer information of said attached program and said processing module correspond with each other when both of said attached program and said processing module associated with said identifier of said object data are present, selecting one of said attached program and said processing module according to a predetermined selected method, when said programmer information correspond with each other, and selecting said attached program when said programmer information are different.

7. The method of processing data according to claim 6, wherein said attached program and said processing module are further respectively provided with version information; and said step of processing program selecting further includes steps of version information comparing for comparing version information of said attached program and said processing module, when both of said attached program and said processing module associated with said identifier of said object data are present and said programmer information correspond with each other, and selecting a program determined newer by said step of version information comparing.

8. A method of processing data in a data processing device having a processing module associated with at least one identifier, for performing a predetermined process for object data associated with said identifier, reading digital data including object data, an identifier indicating a type of said object data, and an attached program for performing a predetermined process for said object data associated with said identifier, to perform a process for said object data using one of said processing module and said attached program, said method comprising steps of:

data reading for reading said digital data;

attached-program's-presence determining for determining whether said attached program is associated with said identifier of the read said object data;

processing module's-presence determining for examining whether said processing module is associated with said identifier of said object data;

processing program selecting for selecting which one of said attached program and said processing module is used for processing based on a determination result of said steps of attached-program's-presence determining and processing-module's-presence determining; and data processing for processing said object data by a program selected by said step of processing program selecting, wherein said step of data processing further includes a step of processing module updating for updating said processing module stored in said data processing device;

said step of processing module updating includes steps of verifying whether said attached program and said processing program associated with said identifier are present in said digital data, replacing said attached program with said processing program based on a predetermined selecting method, for storing, when both of said attached program and said processing module associated with said identifier of said object data, and adding said attached program into said data processing device when only said attached program is present.

9. The method of processing data according to claim 8, wherein said attached program is provided with replacement authentication information when replacement of said processing module of said internal program with said attached program is permitted, said step of processing module updating further includes steps of replacement authentication information determining for determining whether the replacement authentication information is provided, and storing said attached program into said data processing device only when determined that the replacement authentication information is present by said step of replacement authentication information.

10. The method of processing data according to claim 8, wherein each of said attached program and said processing module are provided with programmer information and version information; and said step of processing module updating includes steps of examining whether said programmer information of both said attached program and said processing module correspond with each other, when both said attached program and said processing module associated with said identifier of said object data are present, determining whether version information of said attached program is newer than that of said processing module when both of said programmer information correspond with each other, and storing said attached program into said data processing device in place of said processing module when the attached program is newer than said processing module.

11. The method of processing data according to claim 8, wherein said attached program is provided with replacement authentication information when replacement of said processing module with said attached program is permitted; and said step of processing module updating further includes a step of replacement-authentication-information's-presence determining for determining whether replacement authentication information is applied to said attached program, and storing said processing module into said data processing device only when replacement authentication information is provided, independent of values of said programmer information applied to said attached program and said processing module, and said version information.

* * * * *

UNITED STATES PATENT AND TRADEMARK OFFICE
CERTIFICATE OF CORRECTION

PATENT NO. : 6,701,331 B1
DATED : March 2, 2004
INVENTOR(S) : Yuji Sawada et al.

It is certified that error appears in the above-identified patent and that said Letters Patent is hereby corrected as shown below:

Column 17,
Line 6, please delete "1" and insert -- 3 --

Signed and Sealed this

Twentieth Day of July, 2004

JON W. DUDAS
*Acting Director of the United States Patent and Trademark Office*